April 23, 1963 A. W. SPIRE 3,086,500
LIVESTOCK DRINKING FOUNTAIN
Filed April 27, 1961 2 Sheets-Sheet 1

INVENTOR.
AMBROSE W. SPIRE
BY John H. Widdowson
ATTORNEY

April 23, 1963 A. W. SPIRE 3,086,500
LIVESTOCK DRINKING FOUNTAIN
Filed April 27, 1961 2 Sheets-Sheet 2

INVENTOR.
AMBROSE W. SPIRE
BY John H. Widdowson
ATTORNEY

United States Patent Office 3,086,500
Patented Apr. 23, 1963

3,086,500
LIVESTOCK DRINKING FOUNTAIN
Ambrose W. Spire, Rte. 1, Independence, Kans.
Filed Apr. 27, 1961, Ser. No. 106,005
10 Claims. (Cl. 119—74)

This invention relates to drinking means. In a more specific aspect the invention relates to means for providing water for poultry and the like. More particularly the invention relates to the construction of drinking fountain means and to a system of a plurality of said fountains connected to source of water for providing drinking water and the like to poultry, etc.

This application is a continuation-in-part of application Serial No. 4,559, filed January 25, 1960 entitled, Spire Drinking Fountain, now abandoned.

Various drinking means are known to the prior art, including poultry drinking apparatus. The drinking means of the prior art primarily include single watering devices which must be individually filled and maintained, and where large poultry flocks and the like are being maintained such becomes a burdensome job and substantially increases time required to perform this task. Furthermore, provisions are not made with the prior art devices whereby feed, etc., which tend to accumulate in the drinking system can be easily removed and the drinking system soon becomes contaminated and unsuitable for use.

In accordance with the present invention, new drinking fountain means are provided which overcome the disadvantages of the prior art device. More particularly, the present invention provides means whereby a plurality of individual drinking fountain means can be interconnected so that substantially unattended individual units are provided and which can be maintained at a desired level by remote and automatic means. Individual drinking fountain means in the drinking fountain system of the invention can be height adjustable and incorporate means whereby material tending to contaminate the watering system are prevented from entering the main portion of the system. Furthermore, the present invention provides means whereby the entire system can be flushed out by a simple operation without disturbing the individual units or otherwise requiring attendance of each of the units.

The drinking fountain of the invention includes coupling means for joining the individual fountain to water supply means. Cup means are provided with the cup means receiving water for poultry, etc.

In preferred specific embodiments of the invention, a coupling member or the like is provided and connectable to a fluid supply. An upright positionable tubular member is provided with the connecting member. A cup holder or the like is provided and preferably adjustably mounted on the tubular member. A fountain head generally in the shape of a cup is mounted in the cup holder and means are provided whereby the fountain head is in fluid communication with the tubular member and the coupling member. Thus, when water is provided to the coupling member same can pass through the tubular member and cup holder into the drinking cup. Valve means are preferably provided so that when surges of pressure are received from the water supply the valve member will close and prevent excessive water from reaching the drinking cup member and flooding the fountain.

A plurality of the fountain members are preferably connected to conduit means and same in turn is connected to tank means for maintaining a constant supply of water. Suitable valve means maintain a substantially constant water level in the tank means and by adjustment of the individual fountain means the water level relative thereto can be maintained constant. Preferably, check valve means are provided in the conduit from the tank means so that water under relatively great pressure can be provided to the conduit means connecting the individual fountains to clean the entire system. Overflow members are also desirably provided with the system so that should excessive pressures be encountered or water level in the tank means rise above the desirable level, the overflow means will receive and discharge the excessive water or the like and prevent flooding of the individual fountains.

Accordingly, it is an object of the invention to provide a new drinking fountain means.

Another object of the invention is to provide new drinking fountain means which are height adjustable and connectable to a fluid supply.

Another object of the invention is to provide new drinking fountain means wherein feed and the like is prevented from entering the drinking fountain and contaminating the water system.

A further object of the invention is to provide a new watering system for poultry and the like whereby a plurality of individual drinking fountains can be interconnected through conduit means and connected to a source of water so that the water can be supplied to the entire system without attendance of the individual units.

A still further object of the invention is to provide a new poultry drinking system wherein means are provided to flush the water system and remove material therein tending to contaminate same without requiring attention of the individual drinking fountains.

Another object of the invention is to provide a relatively inexpensive drinking fountain and drinking system which can be easily constructed on the site and operated with a minimum of attendance.

Various other objects, advantages and features of the invention will become apparent to those skilled in the art from the following description taken in connection with the accompanying drawings, in which.

Figure 1:
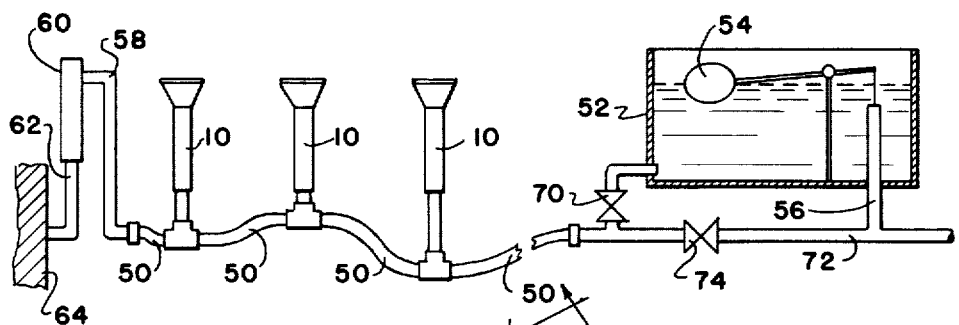
FIG. 1 is an application view, partially in cross section, showing the individual drinking fountains connected into a poultry watering system in accordance with a preferred specific embodiment of the invention.

The following is a discussion and description of a preferred specific embodiment of the new drinking fountain system of the invention and of preferred specific embodiments of the individual drinking fountains used in the system, such being made with reference to the drawings whereon the same reference numerals are used to indicate the same or similar parts and/or structure. It is to be understood that such discussion and description is not to unduly limit the scope of the invention.

Figure 2:
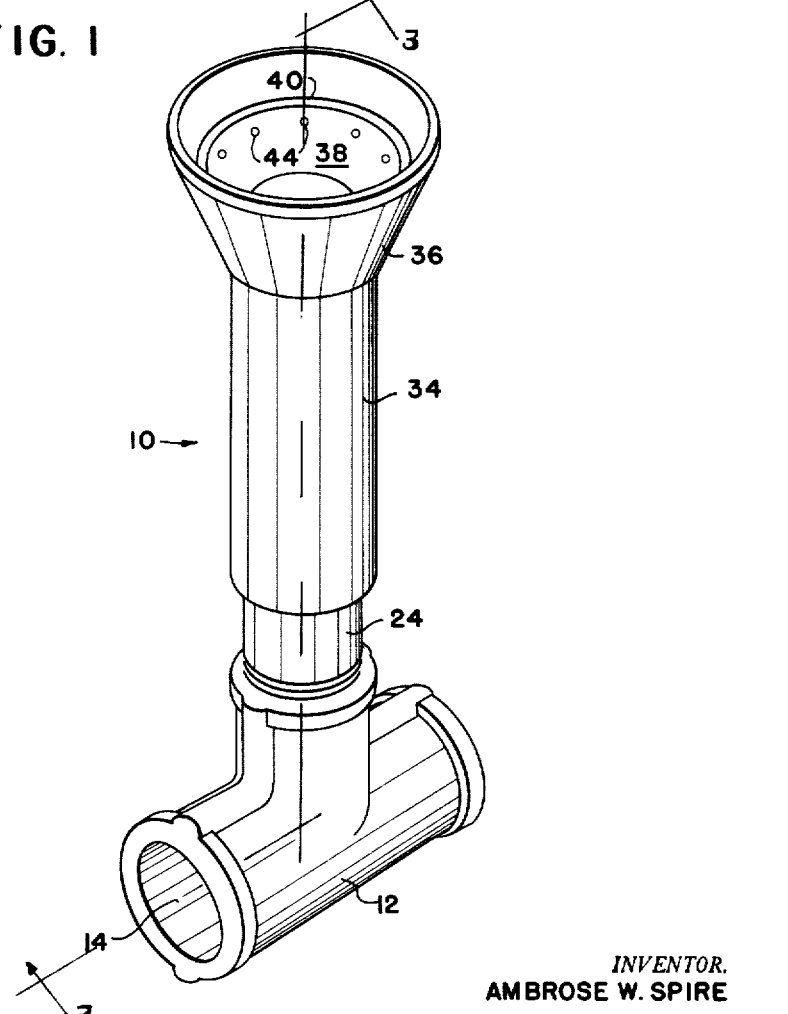
FIG. 2 is an enlarged iso-metric view of a preferred specific embodiment of the individual drinking fountain of the invention.
Figures 3, 4:
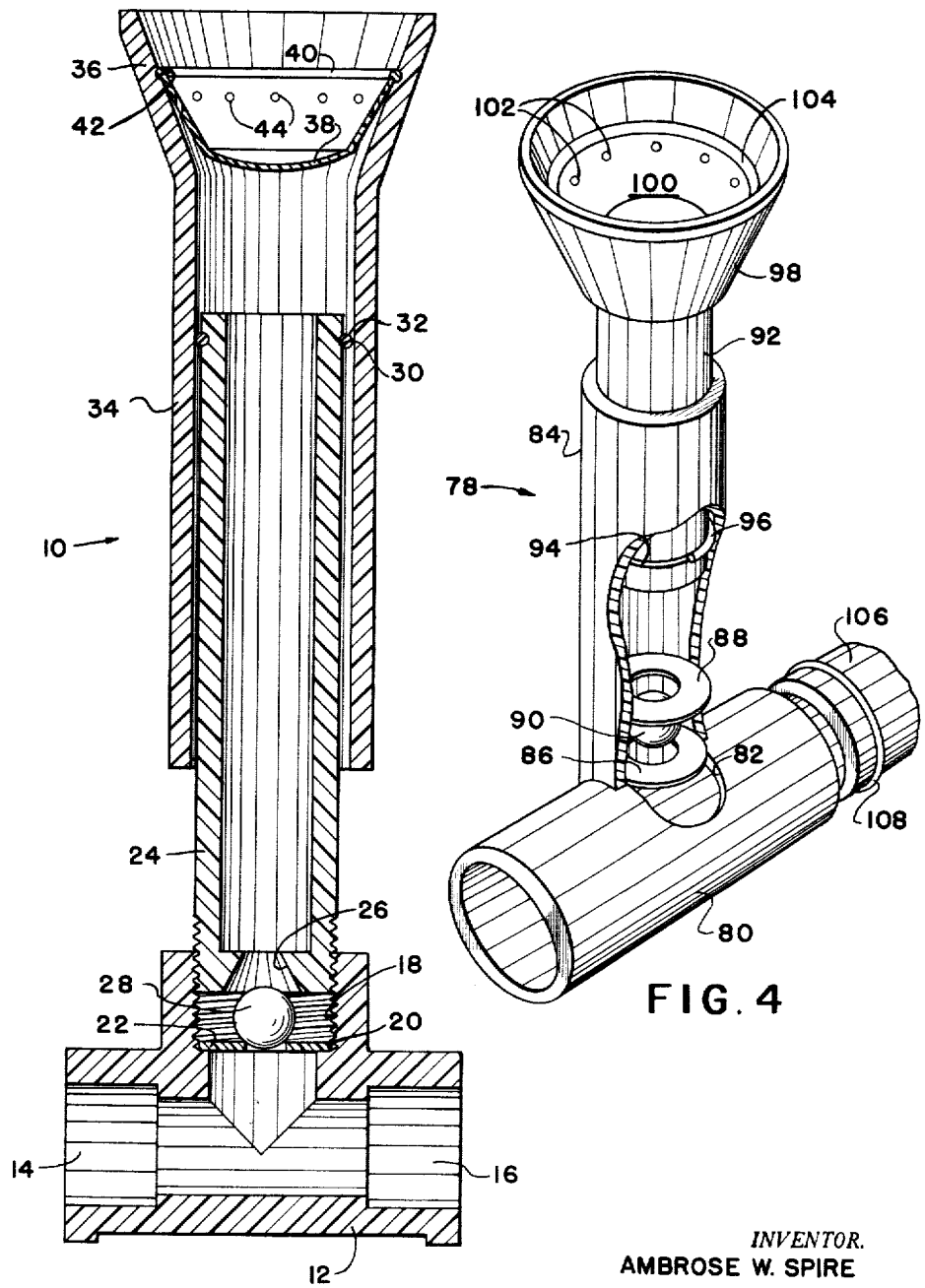
FIG. 3 is an enlarged cross section view taken along the line 3—3 of FIG. 2.
FIG. 4 is an isometric view, partially cut away, showing another preferred specific embodiment of the individual drinking fountain of the invention.

Referring now to the drawings in detail and in particular to FIGS. 2 and 3 wherein a preferred specific embodiment of the drinking fountain of the invention is shown generally at 10. The fountain 10 includes coupling means, such as the member 12 which is preferably generally T-shaped as shown in the drawings. The coupling member 12 is hollow as shown and is provided at opposite end portions with enlarged openings 14 and 16 which are adapted to receive conduit means (not shown) and which can be secured to the conduit means either by telescoping and sealing means as described hereinafter in conjunction with FIG. 4 or such can be rigidly secured thereto by other suitable means. The other end portion of the coupling member 12 is preferably provided with a threaded opening 18 which can be enlarged to form a ledge 20 at the inner end portion thereof.

An annular valve seat 22 is preferably provided and is positioned on the ledge 20 of coupling member 12, the seat 22 having a circular opening in the center portion thereof. A tubular member 24 is preferably provided and is threadedly mounted in one end portion in the threaded opening 18 of the coupling member 12 and projects upwardly and outwardly from the coupling member. The tubular member 24 is preferably provided with a tapered surface 26 at the end thereof which forms a valve seat or, if desired, a separate valve seat member similar to valve seat 22 can be provided and secured to tubular member 24.

A ball or spherical element 28 is provided and is positioned within coupling member 12 between the valve seat 22 and the valve seat 26 on tubular member 24. The ball 28 completes the valve structure and is dimensioned so as to be movable between valve seats 22 and 26 for a reason to be explained in detail hereinafter. While the valve structure shown is preferred due to its simplicity, it is understood that other valve means can be provided if desired.

The other end portion of the tubular member 24 is preferably provided with an annular groove 30 which receives and retains therein an O-ring 32. A cup holder member 34 is provided and one end portion of same is preferably tubular in construction to telescopically receive the tubular member 24 and to slidably and sealingly engage the O-ring 32 to prevent leakage of liquids between the members 34 and 24. Member 34 is adjustable on the tubular member 24 by hand pressure. The other end portion of the cup holder member is preferably tapered outwardly as shown at 36 to provide an enlarged opening. End portion 36 of cup holder 34 is preferably integrally formed with the tubular end portion thereof as shown.

A fountain head or accumulation cup 38 is provided and is preferably generally in the shape of a semi-sphere as indicated in the drawings, however other shapes can be provided, if desired. The fountain head or cup 38 can be removably mounted in the tapered end 36 of cup holder 34 by any suitable means, preferably by providing a circular ridge 40 around the top of the cup which is of size and construction to be snapped into the groove 42 formed in the inner surface of end 36 of the member 34. The fountain head or cup member 38 is provided with an imperforate lower portion which will receive and retain waste, feed and the like therein and a plurality of spaced apertures 44 are provided in a generally circular row adjacent to the ridge 40 around the top thereof. The apertures 44 are in fluid communication with the inside of member 34 so that water or other liquids supplied to coupling 12 can pass upwardly through tubular member 24 and member 34 and thus through opening or apertures 44 into the head or accumulation cup 38. Likewise, the imperforate lower portion of cup 38 will prevent waste from passing downwardly into the member 34 or the member 24 and such can be removed without contaminating the entire watering system.

FIG. 1 illustrates a poultry water system or the like incorporating the individual drinking fountains 10 shown in detail in FIGS. 2 and 3. As illustrated in FIG. 1 the various drinking fountains 10 are connected by lengths of hose or pipe 50 and any desired number of these units can be provided, depending upon the number of poultry in the flock and other conditions. The conduit means 50 are preferably relatively stiff so that supplementary means to maintain the fountain member 10 in an upright position is not necessary. However, if desired, suitable supports or braces (not shown) can be provided to maintain the fountain members in an upright position. The conduit means 50 are connected to a suitable source of water, such preferably being a tank or the like as illustrated at 52. The water level within the tank 52 can be controlled by a float 54 operatively connected to float valve means in the water inlet 56 into tank 52. When adjustment has been made for controlling the water level in the tank 52, the individual fountain members 10 can be adjusted so that the fountain head or accumulation cup 38 within each of the individual fountain means will be substantially at the same height as the water level in the tank means 52 and water will flow by gravity through the conduit means 50, past ball 28 and through members 24 and 34 into the cup 38. This height adjustable feature is very desirable when a plurality of the cup members are used since the area in which the system is used will often be sloping or variable in height relative to the tank means 52.

If desired, suitable overflow means can be provided as illustrated in the left hand portion of FIG. 1. In the overflow means illustrated a hose member 58 is connected in one end portion to the conduit member 50 and is connected in its other end portion to a tubular member 60 which telescopically and slidably receives conduit 62. Conduit 62 leads to drain means (not shown) and can be rigidly supported by suitable support means 64. Members 60 and 62 are preferably constructed and slidably and sealingly connected in the same manner as members 24 and 34 for the individual fountains as shown in FIGS. 2 and 3. This height adjustable feature of the members 60 and 62 is also desirable since the overflow means can then be adjusted in connection with the individual fountain members. If desired, the overflow means This overflow is desirable since it prevents flooding at the individual fountains 10 should the water level in tank means 52 vary or become unadjusted relative to the individual fountain members. If desired, the overflow means can be adjusted to obtain a continuous flow of water therethrough and thus insure freshness of the water in the individual fountains.

In order to provide for cleaning of the entire system without disconnecting the individual fountains and cleaning the individual parts, a check valve 70 is desirably provided between the tank 52 and conduit means 50, the check valve 70 permitting the passage of water from the tank 52 into conduit 50 and preventing water from conduit means 50 to pass into the tank. A by-pass conduit 72 is provided with valve means 74 therein which is closed during normal operation of the device and which can be opened to provide fluid communication from a source of water under pressure directly to the conduit 50. When the valve means 74 is opened and water under pressure is forced into conduit means 50, the check valve 70 will close to prevent water therefrom backing into tank 52, and the water will flow through the conduit 50, out conduit or hose 58 and through the members 60 and 62 to thus clean the entire system. The relatively great pressure thus produced in the lines will be prevented from flowing into the tubular members 24 of the individual fountains 10 and flooding same by the balls 28 therein which will be forced upwardly to seat against valve seat 26 in tubular member 24 and close same. When valve means 74 is closed and water pressure returns to normal the ball 28 will drop by gravity to its normal at rest position against valve seat 22. Ball 28 will, of course, be easily moved from seat 22 by water pressure when the water level in cup 38 is lowered beneath the water level in tank 52.

Another preferred specific embodiment of the drinking fountain of the invention is illustrated in FIG. 4 of the drawings and is shown generally at 78. In this embodiment a tubular coupling member 80 is apertured as shown at 82 and a tubular member 84 is secured to the member 80 to be in fluid communication therewith through the opening or aperture 82. Suitable valve means are preferably provided with fountain 78. In the preferred construction shown the member 84 has two valve seats 86 and 88 mounted therein in spaced relation as illustrated and a ball or valve member 90 is positioned therebetween and is dimensioned to be movable between the valve seats. The operation of the valve is the same as that previously described in connection with fountailn 10 and this valve construction can be used with the fountain 10.

A cup holder 92 is telescopically received by tubular member 82 and holder 92 is provided in its lower end portion with a groove 94 which receives an O-ring 96 and the inner surface of tubular member 84 is sealingly and slidably engaged by the O-ring 96, thus providing for height adjustment of the member 92 relative to the tubular member 84. The upper end portion of member 92 is provided with an outwardly tapered end portion 98 which can be integrally formed therewith or can be separately formed and secured thereto in any suitable manner. The fountain head or accumulation cup 100 is similar in construction to the accumulation cup 38 and is provided with openings or apertures 102 to permit passage of liquids therethrough. A ridge or groove 104 on the outer surface of cup 100 is received by a groove in the inside surface of the end portion 98 to mount the cup in place.

While the tubular member 80 can be relatively long and have a plurality of the members 84 secured thereto, it is preferred that the member 80 be relatively short and secured to conduit means 106 similar to conduits 50 previously described. The end portion of conduit means 106 can be provided with an O-ring or the like 108 with the conduit 106 being telescopically received within member 80 and with the O-ring 108 slidably and sealingly engaging the inner surface thereof to provide a substantially continuous conduit means leading to a water tank or source of fluid. This same means of coupling the various members just described can also be used in connection with the coupling member 12 of the fountain 10 and conduits 50. The individual drinking fountain members shown in FIG. 4 can be connected into a system as illustrated in FIG. 1 for the fountain members 10 and will operate in substantially the same manner.

As will be seen from the foregoing description of the individual fountain members and of the system constructed therewith, a substantially improved drinking fountain and watering system have been provided having utility particularly where large flocks of poulery or the like are being used and such providing for variations in the contour of the land by virtue of the height adjustment provided with each of the fountain members. Also, it will be seen that the entire fountain system can be readily cleaned merely by opening and closing valve means 74, thus eliminating the necessity of disassembling the entire system and cleaning the individual parts separately. This, of course, is very desirable in large operations and eliminates a substantial amount of time and effort normally consumed and associated expense. Insulated electric wire, sometimes called heat tape (not shown), can be used and pass through the conduits and coupling members to prevent freezing of the water. As will be apparent from the foregoing description the entire system is very versatile and can be marketed either as an entire system or the individual fountains and associated structure can be individually sold. While the invention has been described as usable with poultry, it will be apparent that it can be used in other applications, such as in dog kennels, etc.

The individual parts of the drinking fountains and of the drinking system can be made of a wide variety of materials, including suitable plastics, rubber or rubber-like members, metals, etc. Plastics and rubber or rubber-like materials are preferred for the individual drinking fountain due to the ease of assembly, shaping and the use that can be made of standard parts, such as the coupling members and tubular members. The individual conduits as shown at 50 connecting the various fountain members can be metal, plastics, rubber or rubber-like materials, etc.

While the invention has been described in connection with preferred specific embodiments thereof, it will be understood that this description is intended to illustrate and not to limit the scope of the invention, which is defined by the claims.

I claim:

1. A drinking fountain comprising, in combination, a T-shaped coupling member, said coupling member being hollow and having enlarged openings at the opposite end portions thereof adapted to receive conduit means, the other end portion of said coupling member having an enlarged threaded opening therein forming a ledge at the inner end portion thereof, an annular valve seat positioned on said ledge, a tubular member having one end portion thereof threadedly monuted in said other end portion of said coupling member and extending upwardly therefrom, said one end portion of said tubular member being tapered inwardly to form a valve seat, a spherical ball positioned in said coupling member between said valve seat on said ledge and said valve seat on said tubular member and movable therebetween, the other end portion of said tubular member having an annular groove formed in the outer surface thereof, a resilient O-ring positioned in said annular groove in said tubular member, an adjustable cup holder, said cup holder having a cylindrical end portion telescopically receiving said other end portion of said tubular member and slidably and sealingly engaging said O-ring thereon, the other end portion of said cup holder being tapered outwardly, an annular groove formed in the inner surface of said other end portion of said cup holder, and a fountain head in the shape of a cup, said cup being generally semi-spherical in shape and having an enlarged outwardly projecting circular ridge around the top thereof constructed and of such size to be snapped into said groove in said cup holder, said drinking cup having an imperforate lower portion to receive and retain waste and a plurality of apertures therethrough adjacent said ridge thereon and positioned so that when said cup is mounted in said cup holder said apertures provide fluid communication between said cup holder and tubular member and the atmosphere, and said drinking fountain being constructed and adapted so that said coupling member can be connected to a source of water through conduit means so that water can pass through said coupling member into said tubular member and into said cup holder to be received by said cup with said cup preventing waste material and the like from passing into said cup holder and tubular member.

2. A drinking fountain comprising, in combination, a T-shaped coupling member, said coupling member being hollow and adapted to receive conduit means, one end portion of said coupling member having an enlarged opening therein forming a ledge at the inner end portion thereof, valve seat means mountable on said ledge, a tubular member removably mounted in said one end portion of said coupling member and extending upwardly therefrom and spaced from said valve seat, said one end portion of said tubular member having a valve seat thereon, a ball in said coupling member between said valve seat on said ledge and said valve seat on said tubular member and dimensioned to be movable therebetween, an adjustable cup holder telescopically receiving the other end portion of said tubular member and slidably and sealingly positioned relative thereto, and a fountain head in the shape of a cup in said other end portion of said cup holder, said cup having an imperforate lower portion to receive and retain waste and a plurality of apertures near the top thereof positioned so that when said cup is mounted in said cup holder said apertures provide fluid communication between said cup holder and tubular member and the atmosphere, said drinking fountain being constructed and adapted so that said coupling member can be connected to a source of water and water can pass through said coupling member into said tubular member to be received by said cup with said cup preventing waste material and the like from passing into said cup holder and tubular member.

3. A drinking fountain comprising, in combination, a hollow coupling member having enlarged openings in opposite end portions thereof adapted to receive conduit means, a tubular member secured in one end portion to an intermediate portion of said coupling member and extending therefrom, two spaced valve seats secured within said tubular member in said one end portion thereof, a ball positioned between said valve seats and of size and construction to move therebetween and to close said tubular member, a cup holder having a cylindrical end portion telescopically and adjustably received by the other end portion of said tubular member, said cylindrical end portion of said cup holder having an O-ring removably mounted thereon and constructed to sealingly and slidably engage the inner surface of said tubular member, the other end portion of said cup holder being tapered outwardly, an annular groove formed in the inner surface of said other end portion of said cup holder, and a fountain head in the shape of a cup, said cup being generally semi-spherical in shape and having an enlarged outwardly projecting circular ridge around the top thereof constructed and of such size as to be snapped into said groove in said cup holder, said drinking cup having an imperforate lower portion to receive and retain waste and a plurality of apertures therethrough adjacent said ridge thereon and positioned so that when said cup is mounted in said cup holder said apertures provide fluid communication between said cup and tubular member and the atmosphere, and said drinking fountain being constructed and adapted so that said coupling member can be connected to a source of water through conduit means so that water can pass through said coupling member into said tubular member and into said cup holder to be received by said cup with said cup preventing waste materials and the like from passing into said cup holder and tubular member.

4. A watering system for poultry or the like comprising, in combination, a tank, float means with said tank to regulate the level of water therein, inlet conduit means connected to said tank to supply water thereto, outlet conduit means connected to said tank means, a plurality of individual fountain members connected to said outlet conduit means in spaced relation to each other, each of said fountain members being height adjustable to position the upper end portion thereof relative to said tank member and regulate the height of water within said fountain members, each of said fountain members having valve means therein constructed and operable to close said fountain members to the passage of water from said outlet conduit means upon an increase or decrease in the pressure of water delivered to said conduit means, said watering system being constructed and adapted so that water can be introduced to said tank means and discharged therefrom into said outlet conduit means to be received by said fountains.

5. The watering system as recited in claim 4 additionally comprising, a by-pass conduit connected in its end portions to said inlet conduit means and said outlet conduit means, said by-pass conduit having valve means therein operable upon opening of same to provide water under line pressure to said outlet conduit means to flush same, and check valve means in said outlet conduit means adjacent said tank to prevent water from said by-pass conduit from entering said tank.

6. The watering system as defined in claim 4 additionally comprising a height adjustable overflow conduit, said last-named conduit being operatively connected to and in fluid communication with the end portion of said outlet conduit means to in operation prevent flooding of said fountain members.

7. A water system for poultry or the like comprising, in combination, conduit means operably connected in one end portion to a source of water, a plurality of individual drinking fountains secured to said conduit means in spaced relation to each other, said drinking fountains being in fluid communication with said conduit means to receive water from said conduit means each of said drinking fountains having valve means therein constructed and operable to close said fountains to the passage of water from said conduit means upon an increase or decrease in the pressure of water delivered to said conduit means.

8. A drinking fountain comprising, in combination, a coupling member having an opening adapted to receive conduit means, a tubular member connected in one end portion to said coupling member, said tubular member and said coupling member being hollow and having therethrough a passageway for water received by said opening in said coupling member, valve means positioned in said passageway, said valve means including spaced valve seats having openings therethrough for the passage of water and a spherical element positionable between said valve seats and engageable therewith to close said openings therein to the passage of water, an elongated holder member having one end portion thereof telescopically and adjustably connected to the other end portion of said tubular member and in fluid communication with said passageway, a cup-shaped fountain head removably mounted in said holder member and having openings in an upper portion thereof communicating with said holder member for the passage of water therethrough, the lower portion of said fountain head being imperforate to retain waste therein and prevent passage of same into said holder member, said drinking fountain being constructed and adapted so that water provided from a conduit to said opening in said coupling member passes through said passageway therein and in said tubular member through said valve means and into said holder member and through said openings in said fountain head into said fountain head, surges of water into or out of said fountain head being prevented by operation of said valve means.

9. A drinking fountain comprising, in combination, coupling means constructed to receive and mount conduit means in fluid flow relation therewith, a tubular member mounted in one end portion on said coupling means, said tubular member and said coupling means having a passageway therethrough for water and other fluids, valve means positioned in said passageway to open and close said passageway to the passage of water and other fluids, said valve means including spaced valve seats having apertures therethrough and a ball-like member positioned between said valve seats and movable therebetween to engage said valve seats and close said apertures therethrough to thereby prevent flow of fluids therethrough, holder means adjustably mounted on said tubular member and in fluid communication with said passageway, a cup-shaped fountain head removably mounted in said holder means, said fountain head having an imperforate lower portion and an opening adjacent the top thereof in fluid communication with said holder means when said fountain head is mounted therein, said drinking fountain being constructed and adapted so that said coupling means can be connected to a source of water through conduit means and water can pass through said passageway in said coupling means and said tubular member and through said holder means into said fountain head through said opening therein, said valve means being closed upon an increase or decrease in water pressure in said conduit means to prevent surges of water from entering said fountain head.

10. A drinking fountain comprising, in combination, coupling means constructed to receive and mount conduit means in fluid flow relation therewith, connecting means attached to said coupling means, said coupling means and said connecting means having a passageway therethrough, valve means positioned in said passageway to open and close said passageway to the passage of water, said valve means being constructed and operable to be automatically closed upon an increase or decrease in the pressure of water delivered to said coupling means, fountain head means having a water receiving portion, said fountain head means being removably connected to said connecting means and constructed to receive water through an upper portion thereof from said passageway and retain a portion of said water in said water receiving portion, said fountain head means having an imperforate lower portion to prevent waste from entering said passageway from said fountain head means.

References Cited in the file of this patent

UNITED STATES PATENTS

| | | |
|---|---|---|
| 1,259,253 | McCullough | Mar. 12, 1918 |
| 1,322,682 | Erickson | Nov. 25, 1919 |
| 1,328,036 | Drew | Jan. 13, 1920 |
| 2,700,370 | Goff | Jan. 25, 1955 |
| 3,011,517 | Sanford | Dec. 5, 1961 |

UNITED STATES PATENT OFFICE
CERTIFICATE OF CORRECTION

Patent No. 3,086,500                              April 23, 1963

Ambrose W. Spire

It is hereby certified that error appears in the above numbered patent requiring correction and that the said Letters Patent should read as corrected below.

Column 4, line 29, for "fountain members. If desired, the overflow means" read -- fountains 10 and the water level in the tank 52. --; column 5, line 43, for "poulery" read -- poultry --; column 6, line 13, for "monuted" read -- mounted --.

Signed and sealed this 12th day of November 1963.

(SEAL)
Attest:
ERNEST W. SWIDER                             EDWIN L. REYNOLDS

Attesting Officer                               Acting Commissioner of Patents